United States Patent
Zeng et al.

(10) Patent No.: US 11,866,335 B2
(45) Date of Patent: Jan. 9, 2024

(54) METHOD FOR PREPARING GRAPHENE BASED COMPOSITE WAVE-ABSORBING COMPOSITE MATERIAL

(71) Applicants: Chongqing Institute of East China Normal University, Chongqing (CN); East China Normal University, Shanghai (CN)

(72) Inventors: Heping Zeng, Chongqing (CN); Yanwei Huang, Chongqing (CN); Jiayang He, Chongqing (CN)

(73) Assignees: CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 606 days.

(21) Appl. No.: 16/928,459

(22) Filed: Jul. 14, 2020

(65) Prior Publication Data
US 2021/0032111 A1    Feb. 4, 2021

(30) Foreign Application Priority Data
Jul. 30, 2019    (CN) .......................... 201910697434.4

(51) Int. Cl.
*C01B 32/198*    (2017.01)
*C01B 32/194*    (2017.01)
(Continued)

(52) U.S. Cl.
CPC ......... *C01B 32/198* (2017.08); *B01J 13/0008* (2013.01); *B05D 1/005* (2013.01);
(Continued)

(58) Field of Classification Search
None
See application file for complete search history.

(56) References Cited

FOREIGN PATENT DOCUMENTS

| CN | 103450683 | | 12/2013 |
|----|-----------|---|---------|
| CN | 102544530 B | * | 8/2014 |

(Continued)

OTHER PUBLICATIONS

Paimozd et al (Influence of acid catalysts on the structural and magnetic properties of nanocrystalline barium ferrite prepared by sol-gel method, Journal of Magnetism and Magnetic Materials, 2008) (Year: 2008).*

(Continued)

*Primary Examiner* — Colin W. Slifka
*Assistant Examiner* — Logan Edward Laclair
(74) *Attorney, Agent, or Firm* — Hodgson Russ LLP

(57) ABSTRACT

A method for preparing a graphene based composite wave-absorbing material includes: dissolving a water soluble barium salt and a water soluble iron salt into deionized water, respectively; mixing barium salt solution and iron salt solution according to a molar ratio of Ba:Fe of 1:12 to obtain a precursor solution; dispersing a graphene material in deionized water to form a graphene dispersion; adding citric acid, nitric acid and the graphene dispersion into the precursor solution in sequence to form a mixture solution; stirring the mixture solution at a temperature of 50 to 75° C. to obtain a sol; coating and drying aged sol on a substrate to obtain a coating layer; and sintering the coating layer by a laser irradiation.

11 Claims, 1 Drawing Sheet

(51) Int. Cl.
*B01J 13/00* (2006.01)
*B05D 1/00* (2006.01)
*B05D 3/06* (2006.01)

(52) U.S. Cl.
CPC ............ *B05D 3/066* (2013.01); *C01B 32/194* (2017.08); *B05D 2202/25* (2013.01); *C01P 2006/90* (2013.01)

(56) References Cited

FOREIGN PATENT DOCUMENTS

| CN | 104449561 | | 3/2015 |
|---|---|---|---|
| CN | 104449561 A | * | 3/2015 |
| CN | 104786587 | | 7/2015 |

OTHER PUBLICATIONS

Hu et al (Laser sintered single layer graphene oxide reinforced titanium matrix nanocomposites, Composites Part B: Engineering, 2016). (Year: 2016).*
Aboulkhair et al (Reducing porosity in AlSi10Mg parts processed by selective laser melting, Additive Manufacturing, 2014) (Year: 2014).*
Mohammadian et al (Microwave absorption properties of GO nanosheets-BaFe12O19-NiO nanocomposites based on epoxy resin: optimization using Taguchi methodology, 2018) (Year: 2018).*
Machine translation of CN-102544530-B (Year: 2014).*
SIPO, First Office Action for CN Application No. 201910697434.4, dated Apr. 10, 2020.

* cited by examiner

METHOD FOR PREPARING GRAPHENE BASED COMPOSITE WAVE-ABSORBING COMPOSITE MATERIAL

CROSS-REFERENCE TO RELATED APPLICATION

This application claims priority to Chinese Patent Application Serial No. 201910697434.4, filed Jul. 30, 2019, the entire disclosure of which is incorporated herein by reference.

TECHNICAL FIELD

The present disclosure relates to a field of material processing, and particular to a method for preparing a graphene based composite wave-absorbing material and a graphene based composite wave-absorbing material prepared by the method.

BACKGROUND

Wave-absorbing material may absorb electromagnetic waves and convert electromagnetic energy into heat or other forms of energy, and thus may be used in many applications such as microwave communication, stealth technology, microwave darkroom, military electronics and industrial production. However, the wave-absorbing material is limited by its complex preparation method, which has high energy consumption and is not suitable for large scale.

SUMMARY

The present disclosure seeks to solve at least one of the problems that exist in the related art to at least some extent.

Accordingly, in an aspect, the present disclosure provides in embodiments a method for preparing a graphene based composite wave-absorbing material, including: dissolving a water soluble barium salt and a water soluble iron salt into deionized water to form a barium salt solution and an iron salt solution, respectively; mixing the barium salt solution and the iron salt solution according to a molar ratio of Ba:Fe of 1:12 to obtain a precursor solution having a metallic ion concentration in a range of 0.1 to 1.0 mol/L; dispersing a graphene material in deionized water to form a graphene dispersion having a concentration of 0.1 to 0.9 mg/mL; adding citric acid, nitric acid and the graphene dispersion into the precursor solution in sequence to form a mixture solution; stirring the mixture solution at a temperature of 50 to 75° C. to obtain a sol; aging the sol for 18 to 42 h; coating the sol on a substrate and drying the sol at a temperature of 60 to 100° C. to obtain a coating layer; and sintering the coating layer by a laser irradiation having a laser power ranging from 80 to 200 W and an irradiation period of 3 to 20 s to obtain the graphene based composite wave-absorbing material including a compound of a formula of $BaFe_{12}O_{19}$ and graphene.

In another aspect, the present disclosure provides in embodiments a graphene based composite wave-absorbing material, including a compound of a formula of $BaFe_{12}O_{19}$ and graphene, prepared by the method as described above.

In a yet another aspect, the present disclosure provides in embodiments a use of a graphene based composite wave-absorbing material as described above in a wave-absorbing coating.

BRIEF DESCRIPTION OF THE DRAWINGS

These and/or other aspects and advantages of embodiments of the present disclosure will become apparent and more readily appreciated from the following descriptions made with reference to the drawings, in which:

FIG. 1 is a photograph of a precursor sol for preparing a graphene based composite wave-absorbing material according to an embodiment of the present disclosure.

DETAILED DESCRIPTION

Embodiments of the present disclosure are described in detail below, examples of which are illustrated in the drawings. The embodiments described herein with reference to drawings are explanatory, and used to generally understand the present disclosure. The embodiments shall not be construed to limit the present disclosure.

In the present disclosure, a graphene based composite wave-absorbing material including a compound of a formula of $BaFe_{12}O_{19}$ and graphene is designed. Barium-iron oxide served as a material suitable for absorbing electrical and magnetic waves has a low cost, good chemical stability, high coercivity and anisotropy. Graphene based material has advantages of stable structure, high electron mobility, excellent thermal conductivity, high specific surface area and good chemical stability, and thus is designed as a carrier for the barium-iron oxide. With the method for preparing a graphene based composite wave-absorbing material of the present disclosure, the barium-iron oxide of $BaFe_{12}O_{19}$ is supported and coated by the graphene based material to form the composite wave-absorbing material which has improved wave-absorbing performance and stability, a light weight and good mechanical properties (such as modulus, tribology and malleability). Moreover, the method of the present disclosure is easy to operate, energy-saving, and highly efficient, which is suitable for preparing the graphene/$BaFe_{12}O_{19}$ wave-absorbing material in large scale.

The present disclosure provides in embodiments a method for preparing a graphene based composite wave-absorbing material and a graphene based composite wave-absorbing material prepared by the method.

In an aspect, the present disclosure provides in embodiments a method for preparing a graphene based composite wave-absorbing material, including: dissolving a water soluble barium salt and a water soluble iron salt into deionized water to form a barium salt solution and an iron salt solution, respectively; mixing the barium salt solution and the iron salt solution according to a molar ratio of Ba:Fe of 1:12 to obtain a precursor solution having a metallic ion concentration in a range of 0.1 to 1.0 mol/L; dispersing a graphene material in deionized water to form a graphene dispersion having a concentration of 0.1 to 0.9 mg/mL; adding citric acid, nitric acid and the graphene dispersion into the precursor solution in sequence to form a mixture solution; stirring the mixture solution at a temperature of 50 to 75° C. to obtain a sol; aging the sol for 18 to 42 h; coating the sol on a substrate and drying the sol at a temperature of 60 to 100° C. to obtain a coating layer; and sintering the coating layer by a laser irradiation having a laser power ranging from 80 to 200 W and an irradiation period of 3 to 20 s to obtain the graphene based composite wave-absorbing material including a compound of a formula of $BaFe_{12}O_{19}$ and graphene.

In an embodiment, before the coating layer is sintered by the laser irradiation, the coating layer is irradiated by laser at a laser power ranging from 1 to 40 W for a period of 10 s to 15 min.

In an embodiment, the water soluble iron salt includes ferric chloride and ferrous chloride.

In an embodiment, the water soluble barium salt includes barium chloride.

In an embodiment, the graphene material includes graphene oxide and graphene quantum dot.

In an embodiment, the graphene oxide is prepared via a Hummers method or an ultrasonic-assisted Hummers method.

In an embodiment, the graphene quantum dot is prepared via a hydrothermal method.

In an embodiment, the coating is performed via a Czochralski method, a spin-coating method or a casting method.

In an embodiment, citric acid of 0.1 to 0.4 g/ml is added into the precursor solution. Citric acid is dissolved in the solution and is used as a releasing agent.

In an embodiment, nitric acid is a dilute nitric acid solution with a concentration of 0.3 mol/L to adjust a pH of the mixture solution in a range of 3 to 7.

In another aspect, the present disclosure provides in embodiments a graphene based composite wave-absorbing material, including a compound of a formula of $BaFe_{12}O_{19}$ and graphene, prepared by the method as described above.

In a yet another aspect, the present disclosure provides in embodiments a use of a graphene based composite wave-absorbing material as described above in a wave-absorbing coating.

It should be understood that the detail features and advantages in the above embodiments of the method for preparing a graphene based composite wave-absorbing material are also applicable to the embodiments of the graphene based composite wave-absorbing material and use of the graphene based composite wave-absorbing material in the wave-absorbing coating, and will not be described here again.

Example 1

$FeCl_2 \cdot 7H_2O$ and $BaCl_2 \cdot 2H_2O$ as precursor materials were dissolved in deionized water to form an iron salt solution and a barium salt solution, respectively. The barium salt solution and the iron salt solution were mixed according to a molar ratio of Ba:Fe of 1:12 as indicated by a formula of $BaFe_{12}O_{19}$ to obtain a precursor solution having a metallic ion concentration of 0.3 mol/L. After the precursor solution was mixed uniformly by stirring, it stood for further use.

Graphene oxide (GO) was dispersed in the deionized water at a target concentration of 0.3 mg/ml by means of ultrasonic concussion and stirring on a magnetic stirrer. The ultrasonic concussion and the stirring were performed alternatively for three times. Each time, the ultrasonic concussion was performed for 15 min and the stirring was performed for 30 min. A well dispersed GO dispersion was obtained.

0.16 g/ml citric acid, 0.3 mol/L dilute nitric acid and the GO dispersion were added into the precursor solution in sequence to form a mixture solution and the mixture solution was stirred on the magnetic stirrer. With the addition of the dilute nitric acid, pH of the mixture solution was adjusted to be 5. The mixture solution was stirred in a water bath at a temperature of 65° C. for 2 h to form a sol, and the sol was aged for 36 h (a photograph of a precursor sol is shown in FIG. 1).

The aged sol was applied uniformly on an aluminum alloy substrate by a spin-coating method, and the coated substrate was dried in a vacuum drying oven at 60° C. for 2 h to form a coating layer. The coating layer was irradiated by a laser at a laser power of 35 W for 10 s, thus removing organic solvents. The coating layer was sintered in the air by a laser irradiation having a laser power of 150 W for 10 s to obtain a $GO/BaFe_{12}O_{19}$ wave-absorbing material coating.

Such a $GO/BaFe_{12}O_{19}$ wave-absorbing material has a wide effective absorption band, that is, from a band of 8 to 14 GHz, the absorption peak value of the $GO/BaFe_{12}O_{19}$ wave-absorbing material is greater than 4 dB. Compared with a material without the graphene based material, the $GO/BaFe_{12}O_{19}$ wave-absorbing material has improved electric and magnetic wave-absorbing performances.

Example 2

$FeCl_3 \cdot 6H_2O$ and $BaCl_2 \cdot 2H_2O$ as precursor materials were dissolved in deionized water to form an iron salt solution and a barium salt solution, respectively. The barium salt solution and the iron salt solution were mixed according to a molar ratio of Ba:Fe of 1:12 as indicated by a formula of $BaFe_{12}O_{19}$ to obtain a precursor solution having a metallic ion concentration of 0.9 mol/L. After the precursor solution was mixed uniformly by stirring, it stood for further use.

GO was dispersed in the deionized water at a target concentration of 0.6 mg/ml by means of ultrasonic concussion and stirring on a magnetic stirrer. The ultrasonic concussion and the stirring were performed alternatively for three times. Each time, the ultrasonic concussion was performed for 15 min and the stirring was performed for 30 min. A well dispersed GO dispersion was obtained.

0.2 g/ml citric acid, 0.3 mol/L dilute nitric acid and the GO dispersion were added into the precursor solution in sequence to form a mixture solution and the mixture solution was stirred on the magnetic stirrer. With the addition of the dilute nitric acid, pH of the mixture solution was adjusted to be 6. The mixture solution was stirred in a water bath at a temperature of 55° C. for 2 h to form a sol, and the sol was aged for 36 h.

The aged sol was applied uniformly on an aluminum alloy substrate by a spin-coating method, and the coated substrate was dried in a vacuum drying oven at 60° C. for 2 h to form a coating layer. The coating layer was irradiated in the air by a laser at a laser power of 5 W for 10 min, thus removing organic solvents. The coating layer was sintered in the air by a laser irradiation having a laser power of 90 W for 10 s to obtain a $GO/BaFe_{12}O_{19}$ wave-absorbing material coating.

Such a $GO/BaFe_{12}O_{19}$ wave-absorbing material has a wide effective absorption band, that is, from a band of 11 to 12 GHz, the absorption peak value of the $GO/BaFe_{12}O_{19}$ wave-absorbing material is greater than 2 dB. Compared with a material without the graphene based material, the $GO/BaFe_{12}O_{19}$ wave-absorbing material has improved electric and magnetic wave-absorbing performances.

Example 3

$FeCl_3 \cdot 6H_2O$ and $BaCl_2 \cdot 2H_2O$ as precursor materials were dissolved in deionized water to form an iron salt solution and a barium salt solution, respectively. The barium salt solution and the iron salt solution were mixed according to a molar ratio of Ba:Fe of 1:12 as indicated by a formula of $BaFe_{12}O_{19}$ to obtain a precursor solution having a metallic ion concentration of 0.6 mol/L. After the precursor solution was mixed uniformly by stirring, it stood for further use.

GO was dispersed in the deionized water at a target concentration of 0.4 mg/ml by means of ultrasonic concussion and stirring on a magnetic stirrer. The ultrasonic concussion and the stirring were performed alternatively for three times. Each time, the ultrasonic concussion was performed for 15 min and the stirring was performed for 30 min. A well dispersed GO dispersion was obtained.

0.2 g/ml citric acid, 0.3 mol/L dilute nitric acid and the GO dispersion were added into the precursor solution in sequence to form a mixture solution and the mixture solution was stirred on the magnetic stirrer. With the addition of the dilute nitric acid, pH of the mixture solution was adjusted to be 6. The mixture solution was stirred in a water bath at a temperature of 55° C. for 2 h to form a sol, and the sol was aged for 24 h.

The aged sol was applied uniformly on an aluminum alloy substrate by a spin-coating method, and the coated substrate was dried in a vacuum drying oven at 80° C. for 2 h to form a coating layer. The coating layer was irradiated in the air by a laser at a laser power of 24 W for 20 s, thus removing organic solvents. The coating layer was sintered in the air by a laser irradiation having a laser power of 150 W for 10 s to obtain a $GO/BaFe_{12}O_{19}$ wave-absorbing material coating.

Such a $GO/BaFe_{12}O_{19}$ wave-absorbing material has a wide effective absorption band, that is, from a band of 8 to 14 GHz, the absorption peak value of the $GO/BaFe_{12}O_{19}$ wave-absorbing material is greater than 4 dB. Compared with a material without the graphene based material, the $GO/BaFe_{12}O_{19}$ wave-absorbing material has improved electric and magnetic wave-absorbing performances.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples described in the specification, as well as features of embodiments or examples, without conflicting, may be combined by one skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for preparing a graphene based composite wave-absorbing material, comprising:
    dissolving a water soluble barium salt and a water soluble iron salt into deionized water to form a barium salt solution and an iron salt solution, respectively;
    mixing the barium salt solution and the iron salt solution according to a molar ratio of Ba:Fe of 1:12 to obtain a precursor solution having a metallic ion concentration in a range of 0.1 to 1.0 mol/L;
    dispersing a graphene material in deionized water to form a graphene dispersion having a concentration of 0.1 to 0.9 mg/mL;
    adding citric acid, nitric acid and the graphene dispersion into the precursor solution in sequence to form a mixture solution;
    stirring the mixture solution at a temperature of 50 to 75° C. to obtain a sol;
    aging the sol for 18 to 42 h;
    coating the sol on a substrate and drying the sol at a temperature of 60 to 100° C. to obtain a coating layer; and
    sintering the coating layer by a laser irradiation having a laser power ranging from 90 to 200 W and an irradiation period of 3 s to 20 s to obtain the graphene based composite wave-absorbing material comprising a compound of a formula of $BaFe_{12}O_{19}$ and graphene.

2. The method according to claim 1, wherein before the coating layer is sintered by the laser irradiation, the coating layer is irradiated by laser at a laser power ranging from 1 to 40 W for a period of 10 s to 15 min.

3. The method according to claim 1, wherein the water soluble iron salt comprises ferric chloride and ferrous chloride.

4. The method according to claim 1, wherein the water soluble barium salt comprises barium chloride.

5. The method according to claim 1, wherein the graphene material comprises graphene oxide and graphene quantum dot.

6. The method according to claim 5, wherein the graphene oxide is prepared via a Hummers method or an ultrasonic-assisted Hummers method.

7. The method according to claim 5, wherein the graphene quantum dot is prepared via a hydrothermal method.

8. The method according to claim 5, wherein the coating is performed via a Czochralski method, a spin-coating method or a casting method.

9. The method according to claim 1, wherein citric acid of 0.1 to 0.4 g/ml is added into the precursor solution.

10. The method according to claim 1, wherein nitric acid is a dilute nitric acid solution with a concentration of 0.3 mol/L to adjust a pH of the mixture solution in a range of 3 to 7.

11. The method according to claim 1, wherein nitric acid is a dilute nitric acid solution with a concentration of 0.3 mol/L to adjust a pH of the mixture solution in a range of 3 to 5.

* * * * *